United States Patent

White

[11] 3,770,352
[45] Nov. 6, 1973

[54] TOTALLY REFLECTING LASER REFRACTOMETER

[75] Inventor: Matthew B. White, Newport Beach, Calif.

[73] Assignee: Philco-Ford Corporation, Philadelphia, Pa.

[22] Filed: May 8, 1972

[21] Appl. No.: 250,877

[52] U.S. Cl................................. 356/133, 356/136
[51] Int. Cl. ......................................... G01n 21/46
[58] Field of Search.................... 356/134, 135, 136, 356/118; 331/94.5 A

[56] References Cited
UNITED STATES PATENTS

| 3,506,362 | 4/1970 | Doyle et al. .................. 331/94.5 A |
| 3,060,793 | 10/1962 | Wells ................................. 356/118 |
| 3,526,771 | 9/1970 | Henkel et al. ....................... 356/135 |

Primary Examiner—David Schonberg
Assistant Examiner—Conrad Clark
Attorney—Robert D. Sanborn et al.

[57] ABSTRACT

A laser having isotropic polarization characteristics, is operated with a confocal mirror cavity and is adjusted in terms of mirror reflectivity, spacing, and laser active medium to operate at a particular wavelength. A total internal reflection prism is contained inside the laser optical cavity and is rotated to produce an optical path angle slightly greater than the critical angle. For this condition the prism will constrain the laser to oscillate in such a way that adjacent modes have orthogonal polarizations. In the case of two mode operation one mode will be polarized parallel to the plane of incidence at the prism reflecting surface and the other will be perpendicular to the first. The phase shifts produced upon total reflection are different for light polarized parallel and perpendicular to the plane of incidence. Futhermore the difference in the phase shifts for these two polarization directions is a function of the refractive indices of the prism and its facing material as well as the angle of incidence. Since the difference in phase shift is equivalent to a difference in optical cavity length for the two orthogonally polarized modes the frequency of one of the modes is slightly displaced with respect to the other. Measurement of the beat frequency difference between the orthogonal modes will therefore yield information on the refractive index of the facing material provided that prism index and angle of incidence are known.

In one embodiment the prism is provided with a calibrating sample of known refractive index placed in close contact with its reflecting face. The prism and laser cavity are then adjusted to produce a stable mode difference beat frequency. Very small changes in refractive index of the material in contact with the prism face can be correlated with changes in beat frequency thereby giving a very sensitive measure of refractive index. If the comparison sample is a fluid confined inside a chamber sealed to the prism face, extremely slight differences in composition of the fluid can be detected. Since the output is read immediately as a frequency, the system is useful in monitoring flowing fluids.

10 Claims, 5 Drawing Figures

TOTALLY REFLECTING LASER REFRACTOMETER

BACKGROUND OF THE INVENTION

Refractometry has become an extremely useful tool in the arts of chemical analysis and process control. It has been found that solution concentration for specified materials can be precisely determined by measuring the refractive index of the combination. Dilution to a specified refractive index can be employed as a process control for either batch or continuous process operations.

Numerous refractometer designs have been developed to implement refractive index measurements for various applications. For example, the material to be measured is placed in close contact with a standard material and the critical angle for total reflection is measured. Alternatively, image displacement can be measured where the light is caused to pass the interface between standard and unknown materials at a suitable angle. Retardation in an unknown sample can be measured by interference where a monochromatic beam of light is passed through the sample and then beat against a reference beam to produce interference fringes.

In another system a series of beads made of materials of known graded refractive indices is immersed in a liquid to be measured. If any particular bead matches the refractive index of the liquid it will seem to disappear. The least discernable bead is the one most nearly matching the index of the liquid. This technique can be enhanced by making the beads into a series of rods that act as light guides between a light source and photo detector. The guide showing the lowest transmission is the one most nearly matching the liquid index.

In all the above methods, except for the critical angle technique, light must be passed through both the reference and sample materials. Thus high sample transparency is ordinarily required and large samples are often required to achieve reasonable accuracy. Using the critical angle measurement, poorly transmitting samples can still be measured with good accuracy. This is due to the fact that slightly above the critical angle for reflection, the light only passes a short distance into the sample material and only the reference material need be highly transparent.

In refractometry, the important measurement factors include small sample size, accuracy, ease and speed of readout, and sensitivity. In order to achieve desired performance several of the above techniques have often been combined in prior art machines because no single technique ordinarily combines all of the best features.

SUMMARY OF THE INVENTION

It is an object of the invention to measure refractive index on a small sample of material to a high degree of accuracy and sensitivity very rapidly.

It is a further object to facilitate such measurements on samples having poor optical transparency.

It is a still further object of the invention to use a laser source in the measurement of refractive index where adjacent mode beat frequency is used as the output indication.

It is a still further object to employ the optically anisotropic characteristics of near critical angle total internal reflection to control the operation of a dual-polarization laser.

These and other objects are achieved by means of a laser having isotropic polarization characteristics. That is the laser is constructed so as not to favor any particular optical polarization. The laser medium is selected to have a transition that produces optical energy in the wavelength desired for the measurement. The laser cavity is established to support oscillation at the selected wavelength and usually employs confocal mirrors, one of which is slightly transparent. Included inside the optical cavity is a reflecting prism, of known refractive index, that bends the cavity path so that reflection from the prism face at near the critical angle is necessary to couple the cavity mirrors. The sample to be evaluated is placed in intimate contact with the reflective prism face. Near the critical angle the prism-sample combination introduces anisotropy in the form of an effective birefringence into the laser system so as to produce dual-polarization operation. Laser oscillation can occur in only two polarization states because the constructive interference required to produce stable laser modes can only occur for the polarization parallel to the plane of incidence at the prism reflecting surface and for the orthogonal polarization. All other polarization conditions result in nonconstructive interference thereby preventing laser oscillation for these conditions. Where laser oscillation is constrained to two adjacent oscillating modes they will have exactly orthogonal polarizations that lie in directions that are parallel and perpendicular to the prism plane of incidence. Since the total internal reflection process produces a differential phase shift for light polarized in these mutually orthogonal directions an effective differential optical cavity length (i.e. birefringence) is introduced for the two modes. The modes will therefore operate at different frequencies with the difference determined by the magnitude of the differential phase shift. The amount of differential phase shift is a known function of the angle-of-incidence, refractive index of the prism, and refractive index of the sample. Hence, if the angle-of-incidence and prism index are known a measure of the mode beat frequency difference can be correlated with the sample refractive index. Since frequency measurements can be made quite accurately a very sensitive refractive index measure is available.

DESCRIPTION OF THE EQUIPMENT

Figure 1:
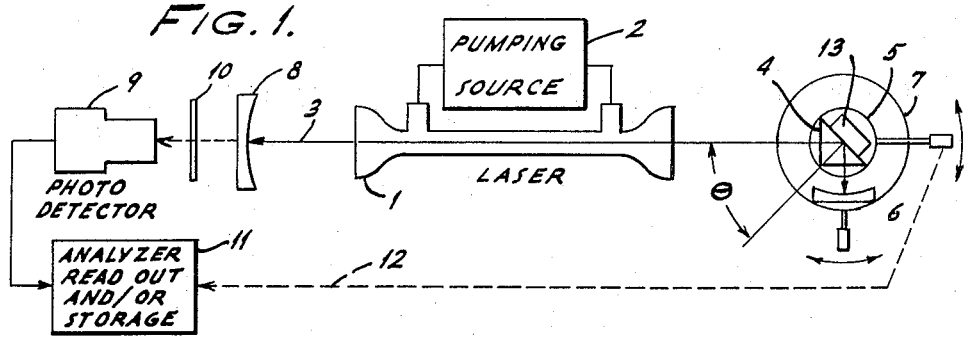
FIG. 1 shows in partial block diagram form a totally reflecting laser refractometer.

In FIG. 1 of the drawing a laser 1 having suitable pumping or excitation means 2 is located inside an optical cavity the axis of which is indicated by the bent solid line 3 each end of which terminates in an arrowhead. While the preferred laser is a gas discharge device using a d-c plasma exciter at 2, any suitable active medium that will produce energy at the desired wavelength will serve. For example the He-Ne laser provides transitions for operating in the vicinity of 0.633, 1.15, and 3.39 microns. He-Xe operates well at 2.03 and 3.5 microns. $CO_2$ is useful at 10.6 microns. In general, laser materials are available from near ultra violet to far infra red. Some, like the organic dye liquids, are easily tunable over a broad range of frequencies. The laser should desirably be capable of operating continuously at low power but, with suitable measurement circuitry, could be pulsed.

The preferred laser 1 is made isotropic in that it will accommodate light of any polarization. The laser end windows are made slightly out of parallel to prevent their acting as resonators, but the departure from parallelism is not sufficient to introduce polarizing effects. Desirably the interior of the laser tube is made a diffuse reflector to discourage wall-reflected oscillatory modes. Such a laser is described more completely in my U.S. Pat. No. 3,500,233.

Prism 4 is mounted on rotary platform 5 so that angle $\theta$ can be adjusted to the critical value. Mirror 6 is made to have high reflectivity over the wavelengths to be used and is mounted on rotary platform 7 so that its angle relative to the axial path 3 can be adjusted to accommodate various angles of prism 4. Mirror 8 is similar to mirror 6 but is made partly transmissive (on the order of 1 to 2 percent) to allow efficient laser operation yet couple out a small portion of the laser energy.

It can be seen that the two mirrors provide resonator action, and the laser with its pumping source provides the negative temperature medium for oscillation. Since the optical path includes prism 4, anisotropy is introduced into the otherwise isotropic system. The prism which totally reflects optical energy that strikes its reflective back face will be the dominant polarization-controlling element in the system. Only optical energy that is polarized either parallel or perpendicular to the plane-of-incidence at the prism surface can achieve a stable stationary standing wave pattern or mode in the optical resonator. Hence all other polarization states are excluded.

Photodetector 9 senses the laser output from mirror 8 through a polarizer. Polarizer 10 is oriented at about 45 degrees with respect to the laser polarization states and mixes the orthogonal output signals so that photodetector 9 will heterodyne them. The output from the photodetector will contain a d-c component representing the laser light intensity and an a-c component representing the beat frequency difference between the laser modes. Analyzer 11 may simply be a frequency indicator or spectrum analyzer, and it may further include elements that convert the frequency indication into refractive index indications. In the latter case prism angle $\theta$ information in the form of dashed line 12 must be fed into the analyzer.

Figure 2:
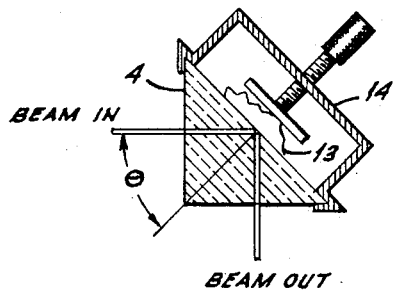
FIG. 2 shows the details of the prism of FIG. 1 in regard to measuring small irregular solid samples.
Figure 3:
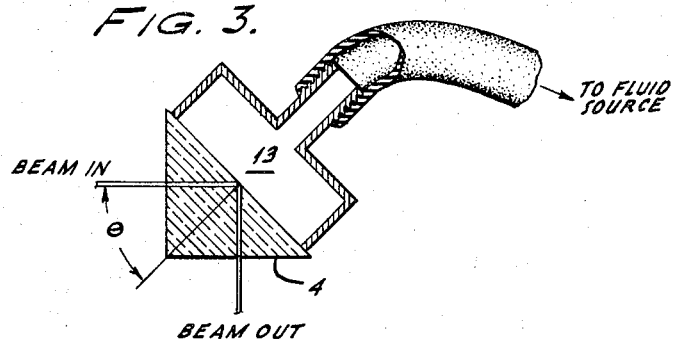
FIG. 3 shows a fluid chamber attached to a prism for measuring static fluid volumes.

Sample 13, the refractive index of which is to be evaluated can be in the form of a solid, liquid, or gas. In solid form the sample face should be polished flat so as to intimately conform to the mating prism face as shown in FIG. 2. Screw clamp 14 holds the sample in place on the prism face. Since the optical penetration into the sample is small for total internal reflection, the sample can be made quite thin. The sample lateral dimensions need only be large enough to cover the laser active spot on the prism face. This is ordinarily on the order of a few millimeters in diameter. If the sample is more nearly equal to the size of the beam it must be accurately positioned with respect to the beam. Larger samples do not require accurate positioning.

Where the sample is a liquid or gas, a confining cell is mounted on the prism face so that the sample is in direct contact therewith as shown in FIG. 3. The sample cell can be filled and sealed off. If desired, variable pressure means can be included in its structure. Inlet and outlet flow channels can also be provided for rapid sample changing.

Figure 4:
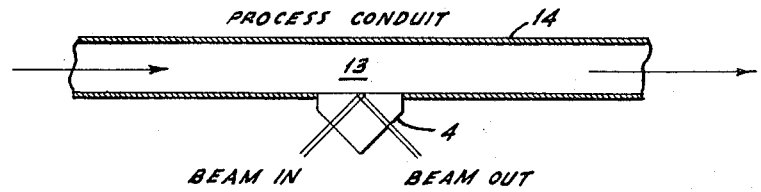
FIG. 4 shows a prism sealed into a conduit in a fluid flow system for measuring a flowing liquid or gas.

As shown in FIG. 4 the prism 4 can be sealed into a wall of a process conduit 14 carrying a flowing fluid that is to be evaluated. In this case the fluid flowing in the conduit should be homogeneous and the flow rate such that turbulence in the vicinity of the prism avoided.

Figure 5:
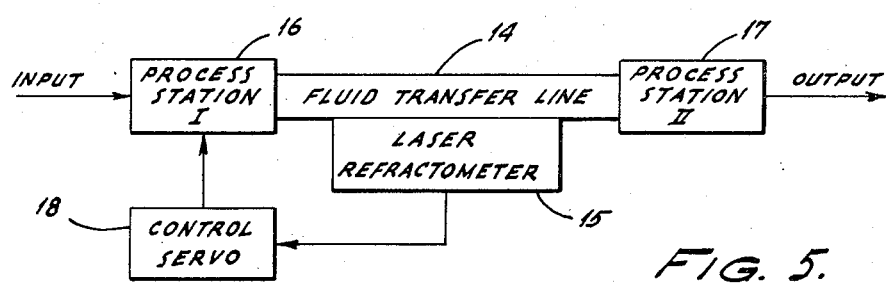
FIG. 5 shows a process control system using the invention.

FIG. 5 shows how the laser refractometer can be used in process control. The refractometer of FIG. 1 is associated with a fluid transfer line 14 such as the one shown in FIG. 4 and is designated as 15. An input processing station 16 could for example mix two or more liquids for transfer to an output processing station 17 which could be for example a bottle filling device. The mixing process is to be controlled for uniformity of produce bottled. The desired mixture in line 14 has a particular refractive index and refractometer 15 is adjusted to provide a known output for this value. If the refractive index in the fluid from station 16 changes, refractometer 16 will feed a different signal to servo 18 which then adjusts the process to restore the original refractive index. Since the refractometer will respond strongly to very small changes in refractive index, excellent control over the process can be maintained.

Prism 4 should be homogeneous, transparent, and of high optical quality. The sample and optical faces should be polished flat. The prism material will depend upon the operating laser wavelength. For visible light glass or quartz may be used. For near infra red, quartz or sapphire may be required. Far infra red may call for such materials as germanium, silicon, rock salt, or one of the Irtran series of materials. In general it is necessary that the prism be transparent to the operating light wavelength, mechanically capable of coping with the conditions of use, and chemically inert to any sample materials that may contact it.

OPERATION OF THE INVENTION

The output of a dual polarization laser comprises two orthogonally polarized components having frequencies $\nu_1$ and $\nu_2$. The frequency difference or beat frequency is $\nu_1 - \nu_2 = \Delta\nu$ and is given by the expression:

$$\Delta\nu = (C/2L)(\phi_1 - \phi_2)/\pi \tag{1}$$

where:
  $C$ = speed of light in meters per second
  $L$ = length of laser cavity in meters
  $\phi_1$ = total phase shift of component 1 for a single pass through the cavity
  $\phi_2$ = total phase shift of component 2 for a single pass through the cavity
$\Delta\nu$, the a-c component of the photo detector 9 (FIG. 1) output, can be easily measured to high precision.

Simple total internal reflection theory indicates that, neglecting optical absorption, the system of FIG. 1 will have a differential phase shift $\phi_1 - \phi_2$ between the orthogonally polarized modes given by:

$$\tan\frac{(\phi_1-\phi_2)}{2}=\frac{\cos\theta[\sin^2\theta-(N_s/N_p)^2]^{1/2}}{\sin^2\theta} \quad (2)$$

where:
$\theta$ = angle of incidence at prism face
$N_s$ = sample index of refraction
$N_p$ = prism index of refraction combining equations 1 and 2 and rearranging terms gives:

$$N_s/N_p = (\sin^2\theta - \tan^2[\Delta\nu(\pi L/C)]\sin^4\theta/\cos^2\theta) \quad (3)$$

Equation (3) shows that the refractive index ratio is a function of three variables; cavity length, angle of incidence, and the beat frequency. Since each of these three variables can be measured, refractive index can be determined.

By differentiating equation (3) with respect to $N_s$ and assuming a fixed $\theta$, the following results:

$$\frac{d(\Delta\nu)}{dN_s}=\frac{C}{\pi L}\frac{N_s\cos^2\theta\cos^3\left[\Delta\nu\left(\frac{\pi L}{C}\right)\right]}{N_p^2\sin^4\theta\sin\left[\Delta\nu\left(\frac{\pi L}{C}\right)\right]} \quad (4)$$

Equations 3 and 4 show that the sensitivity of the system is maximum near the critical angle where $\sin\theta = N_s/N_p$. By substituting $\sin\theta \approx N_s/N_p$ and $\Delta\nu(\pi L/C) \approx 0$, equation (4) reduces to:

$$\frac{d(\Delta\nu)}{dN_s} \approx \left(\frac{C}{\pi L}\right)^2 \frac{N_p^2(1-N_s^2/N_p^2)/N_s^3}{\Delta\nu} \quad (5)$$

If a 1 meter laser cavity is used with a sample having an index of 2 against a germanium prism ($N_p = 4$), and assuming that $\theta$ has been adjusted to produce a $\Delta\nu$ of 1 MHz, equation 5 reduces to:

$$d(\Delta\nu) \cong 1.5 \times 10^{10}\, dN_s \quad (6)$$

Equation (6) shows that a fluctuation of 0.00001 in sample refractive index would give rise to a 150 KHz variation in detector output frequency. Such a measurement could be made in a small fraction of a millisecond. This shows that the system is capable of monitoring very small changes in refractive index in a continuous manner for a flowing system. Thus it is readily adaptable to servo-controlled process systems.

In a carbon dioxide dual polarization laser system operating at about 10.6 microns, measurement of the refractive index difference between helium and air was made. The prism material was NaCl and was first faced with an air sample at 10 p.s.i. The prism was rotated for a beat frequency output of 1.7 MHz. A shift of 0.45 MHz was observed when helium at 10 p.s.i. was substituted for the air in the sample cell. This indicated a change in index of 0.000065, a value that is consistent with a value obtained by extrapolating published data for the visible portion of the spectrum.

As shown particularly by equation (3), absolute measurements of sample refractive index can be made in terms of prism index, $\theta$, cavity length, and beat frequency. However since the ideal conditions, including complete sample transparency, are seldom met in practice where less than ideal conditions occur, corrections must be applied to the formula to obtain a high degree of accuracy. Where a series of measurements are to be taken, it is more practical to calibrate the device in terms of samples of known refractive index. First the system is adjusted so that dual polarization operation occurs over the intended sample range and the rotary element locked in place. Then the beat frequency is noted for known index samples in the range of interest. A calibration curve is then plotted for the known samples using at least three points for any given calibration. Unknown samples can then be located on the curve by simply reading the beat frequency and reading out refractive index from the curve.

While a laser system and certain alternative active device forms and several sample arrangements have been described, numerous alternatives will occur to a person skilled in the art. For example the photo detector and polarizer could be combined with either laser mirror which would be made slightly transmissive. Both mirrors could be made slightly transmissive or both could be made highly reflective with some other means, such as a beam splitting mirror, employed to extract a signal for the photo detector. Furthermore one of the laser mirrors could be combined with the laser active device structure. Mirror configurations other than confocal could be employed. The invention is intended to be limited only by the following claims.

I claim:
1. A refractometer comprising:
   a. a laser,
   b. means associated with said laser to produce dual-polarization operation, said means comprising a prism rotated to produce total internal reflection of the light signal in said laser,
   c. means for converting a portion of the output of said laser to an electrical signal having a frequency equal to the difference in frequency between dual polarization laser modes, and
   d. means for maintaining in close optical contact with the reflecting face of said prism, a sample of material to be evaluated, whereby said electrical signal is a function of the ratio of the refractive index of said sample to the refractive index of said prism.
2. The refractometer of claim 1 wherein said means for maintaining is adapted to handle a solid sample.
3. The refractometer of claim 1 wherein said means for maintaining is adapted to handle a fluid sample.
4. The refractometer of claim 3 wherein said means for maintaining is adapted to handle a fluid sample that is in motion.
5. The refractometer of claim 4 wherein said sample is being processed and said electrical signal is used in a process control system.
6. A refractometer comprising:
   a. an optical resonant cavity having a well defined optical axis,
   b. a laser active medium contoured to avoid favoring any polarization state of optical energy therein, and located inside said resonant cavity,
   c. means for pumping said laser active medium to a level sufficient to establish laser action along said optical axis, d. means for producing dual-polarization laser action by introducing polarization anisotropy inside said cavity comprising:
  1. an optical prism mounted in said cavity and oriented so that said optical axis approaches a face inside said prism near the critical angle for total internal reflection and
  2. means for locating a sample to be tested in intimate contact with said face of said prism,
e. means for extracting a portion of the optical energy in said cavity, and
f. means for converting the optical signals resulting from said anisotropy into an electrical signal having a frequency related to the refractive index of said sample.

7. The refractometer of claim 6 wherein said means for locating is adapted to accommodate a solid sample having at least one flat polished face thereon to conform with said face of said prism.

8. The refractometer of claim 6 wherein said means for locating is adapted to maintain a sample fluid in contact with said face of said prism by means of an enclosure mounted on said prism.

9. The refractometer of claim 8 wherein said means for locating is further adapted to contain a fluid in motion in a fluid process and said means for converting of clause (f) provides a continuous readout related to the refractive index of said fluid.

10. The refractometer of claim 9 wherein said fluid emanates from a process control operation regulated by a servomechanism, said refractometer providing control information to said servomechanism to stabilize the refractive index of said fluid in said process.

* * * * *